(12) United States Patent
Hargraves et al.

(10) Patent No.: US 11,395,778 B2
(45) Date of Patent: Jul. 26, 2022

(54) SEAT BASE ASSEMBLY OF A VEHICLE

(71) Applicant: The Braun Corporation, Winamac, IN (US)

(72) Inventors: Justin Hargraves, Winamac, IN (US); Bill Newton, Rochester, IN (US); Jeffrey Tigges, Dubuque, IA (US)

(73) Assignee: The Braun Corporation, Winamac, IN (US)

( * ) Notice: Subject to any disclaimer, the term of this patent is extended or adjusted under 35 U.S.C. 154(b) by 26 days.

(21) Appl. No.: 17/030,517

(22) Filed: Sep. 24, 2020

(65) Prior Publication Data

US 2021/0007917 A1   Jan. 14, 2021

Related U.S. Application Data

(62) Division of application No. 15/895,054, filed on Feb. 13, 2018, now Pat. No. 10,813,803.

(60) Provisional application No. 62/458,097, filed on Feb. 13, 2017.

(51) Int. Cl.
| | |
|---|---|
| *B60N 2/10* | (2006.01) |
| *A61G 3/08* | (2006.01) |
| *B60N 2/015* | (2006.01) |
| *B60N 2/90* | (2018.01) |
| *B60N 2/24* | (2006.01) |
| *B60N 2/02* | (2006.01) |

(52) U.S. Cl.
CPC ....... *A61G 3/0808* (2013.01); *B60N 2/01516* (2013.01); *B60N 2/01583* (2013.01); *B60N 2/01591* (2013.01); *B60N 2/10* (2013.01); *B60N 2/245* (2013.01); *B60N 2/919* (2018.02); *B60N 2002/0272* (2013.01); *B60N 2002/924* (2018.02)

(58) Field of Classification Search
CPC ............ B60N 2/01583; B60N 2/01591; B60N 2002/0272
USPC .......................................................... 296/64
See application file for complete search history.

(56) References Cited

U.S. PATENT DOCUMENTS

| | | | |
|---|---|---|---|
| 5,524,952 | A | 6/1996 | Czech |
| 6,334,643 | B1 | 1/2002 | Lindblad et al. |
| 8,033,589 | B2 | 10/2011 | Kusanagi |
| 8,033,608 | B2 | 10/2011 | Yoshida |
| 8,066,327 | B2 | 11/2011 | Tomandl |
| 8,998,558 | B2 | 4/2015 | Kitchin |
| 9,326,900 | B2 | 5/2016 | Bancroft |

(Continued)

FOREIGN PATENT DOCUMENTS

JP       2013001159 A    *   1/2013

*Primary Examiner* — Pinel E Romain
(74) *Attorney, Agent, or Firm* — Stephen Rost; Daniel Tallitsch

(57) ABSTRACT

A modified OEM vehicle having an interior for accommodating a passenger in a wheelchair including a floor base assembly, a seat, and a seat base assembly operatively connected to the seat. The seat base assembly includes a lower seat base assembly configured to be coupled to the floor base assembly, an upper seat base assembly pivotably coupled to the lower seat base assembly, and an actuator coupled to the lower seat base assembly and to the upper seat assembly. The actuator includes a retracted position in which the seat is located in a seated position and an extended position in which the seat is located in a tilted position, wherein the tilted position of the seat provides additional space for the wheelchair within the interior of the vehicle.

8 Claims, 16 Drawing Sheets

(56) References Cited

U.S. PATENT DOCUMENTS

| | | |
|---|---|---|
| 2010/0052334 A1 | 3/2010 | Hart |
| 2010/0148555 A1 | 6/2010 | Lung et al. |
| 2010/0320812 A1* | 12/2010 | Linkner ............ B60N 2/01583 297/217.7 |
| 2012/0091772 A1 | 4/2012 | Egan |

* cited by examiner

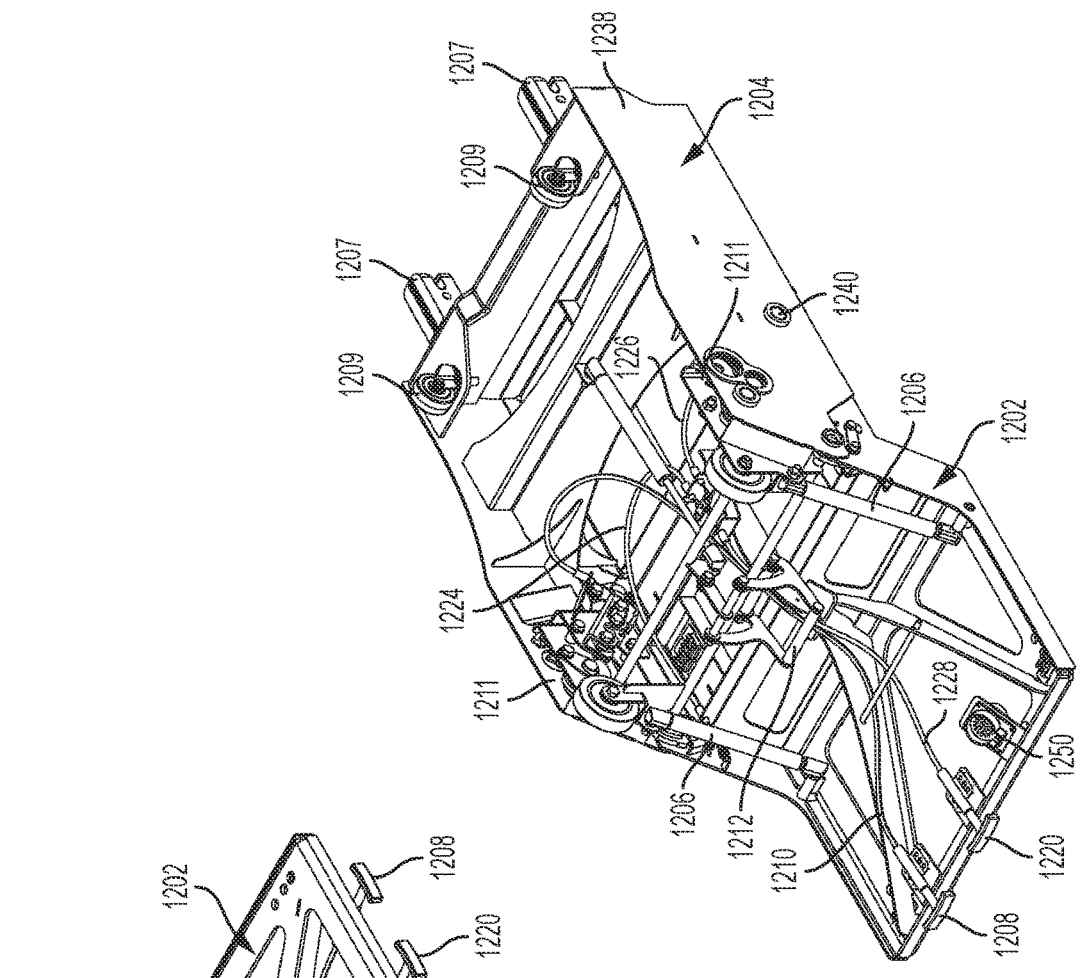
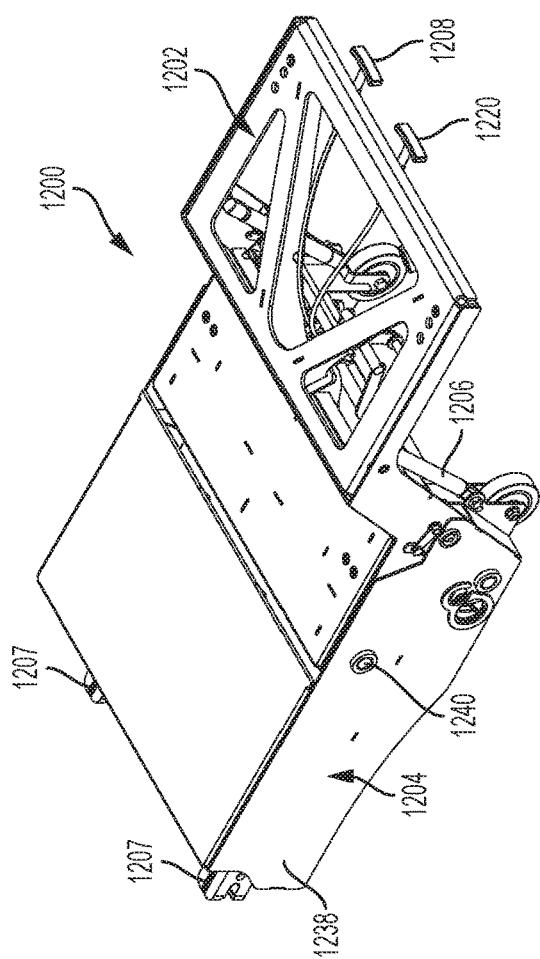
FIG. 12A
FIG. 12B

SEAT BASE ASSEMBLY OF A VEHICLE

CROSS-REFERENCE TO RELATED APPLICATION

This application is a divisional application of U.S. patent application Ser. No. 15/895,054, filed Feb. 13, 2018, which claims the benefit of U.S. Provisional Patent Application Ser. No. 62/458,097 having the title "Seat Base Assembly of a Vehicle" filed Feb. 13, 2017, the contents of which are hereby incorporated by reference in their entirety.

FIELD OF THE DISCLOSURE

The present application relates to a passenger vehicle for transporting one or more passengers, and more particularly to a passenger vehicle which is retrofitted for transporting one or more passengers seated in a wheelchair.

BACKGROUND

Automobile manufacturers do not currently mass-produce passenger vehicles specifically designed to transport passengers having physical limitations, either as a driver or as a non-driving passenger. Consequently, mass-produced passenger vehicles are modified, or retrofitted, by a number of aftermarket companies dedicated to supplying vehicles to physically limited passengers. Such vehicles can be modified by removing certain parts or structures within a vehicle and replacing those parts with parts specifically designed to accommodate the physically limited passenger. For example, in one configuration a van is retrofitted with a ramp to enable a physically limited individual using a wheelchair to enter the vehicle without the assistance of another person.

Other known products for retrofitting a vehicle, such as a van, include wheel chair lifts, lift platforms, and lowered floor surfaces. In some instances, a door of an original equipment manufacturer (OEM) van is enlarged or otherwise modified to permit entry of the physically limited individual through what is known as the assisted entrance. Once inside the vehicle, individuals who use the assisted entrance are often located in a rear passenger compartment of the van adjacent to or behind the assisted entrance.

While these seating locations provide for the transport of the physically limited individual, such locations do not always lend themselves to providing good sightlines which enable the passenger to see a complete view of the road and the surrounding scenery. Consequently, what is needed is a modification to an OEM vehicle which allows the physically limited individual seated in a wheelchair to be located in the front passenger compartment, either as the passenger or as the driver.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein:

FIG. 12A illustrates a further embodiment of a perspective top view of seat base assembly capable of articulating.

FIG. 12B illustrates a perspective bottom view of seat base assembly capable of articulating.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

Figure 1:
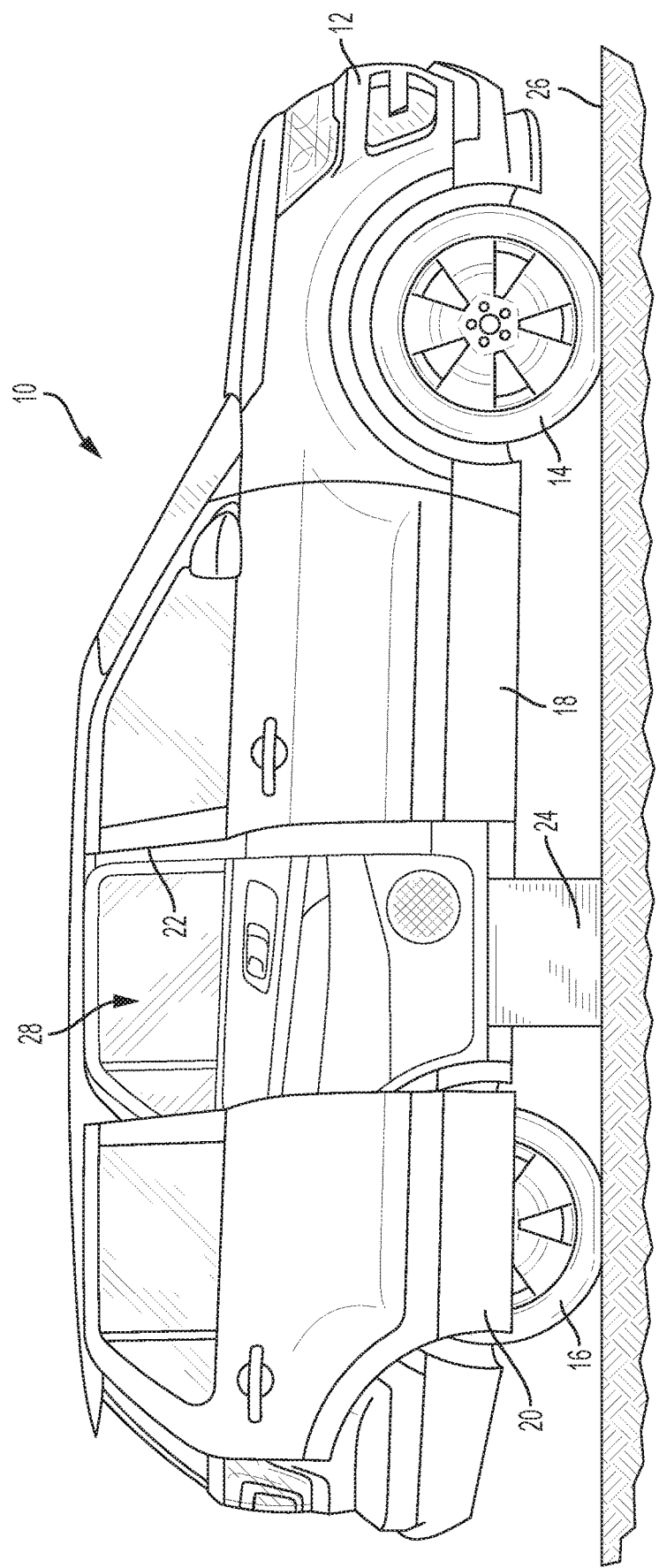
FIG. 1 illustrates an elevational side view of a sport utility vehicle including an access ramp.

FIG. 1 illustrates a sport utility vehicle (SUV) 10 available from any number of United States and foreign manufacturers. In the illustrated embodiment, the SUV, also called a crossover vehicle, includes a unibody construction, but other SUV's having a frame on body construction, are also included in the present disclosure. Consequently, the use of SUV herein includes all types and kinds of sport utility vehicles constructed with a body on frame construction, a unibody construction, or other constructions. In addition, while the SUV is illustrated in FIG. 1, the present disclosure is directed to all passenger vehicles carrying one or more passengers, including vans and sedans.

FIG. 1 illustrates the SUV 10 including a body 12 operatively coupled to front wheels 14 and rear wheels 16. The SUV 10 includes a unibody construction. A first passenger side door 18 is located between the front wheels 14 and rear wheels 16 and provides access to a passenger for sitting in a front seat of the vehicle adjacent to the driver. In this position, the passenger has a clearer view of the road when compared to sitting in a middle row or back row of seats of the vehicle.

The SUV 10 has been modified to include a second passenger side door 20 coupled to the unibody frame through a mechanical linkage (not shown). In other embodiments, the side door 20 is coupled to the unibody frame through a sliding mechanism. In this embodiment, the second passenger side door has been modified to slide along a track (not shown), as opposed to the manufacturer supplied door which is hinged to swing away from the vehicle, as is understood by those skilled in the art. In addition to modifying the door 20 to slide along the track, an opening 22 to the interior, in some embodiments, is modified or widened to provide access to a passenger seated in a wheelchair. The opening is defined on the sides thereof by an edge of the door 20 and the edge of the door 18. The vehicle is further modified to include a ramp assembly 24 which provides rolling access of the wheelchair from pavement 26 into an interior 28 of the vehicle 10. To provide sufficient room for the ramp assembly 24 to be carried in the vehicle, the pre-existing floor of the vehicle may be removed and a new floor is installed which is lower than the old floor. The lowered floor of the vehicle provides a storage location for the ramp assembly 24 and also increases the headspace for a wheelchaired passenger. The ramp assembly 24 is installed at the opening 22 and is movable between the interior of the vehicle, where it is stored in some embodiments, and to the exterior for wheelchair access.

In known modified vehicles, such as modified vans, the middle row of seats is removed from the manufacturer supplied vehicle to enable access to a wheelchair supporting a passenger. Once the wheelchaired passenger moves into the interior of the vehicle, the passenger or caregiver locates the wheelchair in the middle portion of the interior behind the driver and passenger seats of the front row. While the wheelchaired passenger is readily and safely transported by the vehicle, when located at this position, the passenger can have difficulty communicating with the driver and difficulty viewing the road and surrounding scenery. This location is therefore often frustrating for many individuals, particularly those individuals who led active lives prior to becoming disabled and who continue to be active. As used herein, wheelchaired passenger is used to indicate that the individual is making use of a wheelchair, whether that use is temporary or permanent.

Figure 2:
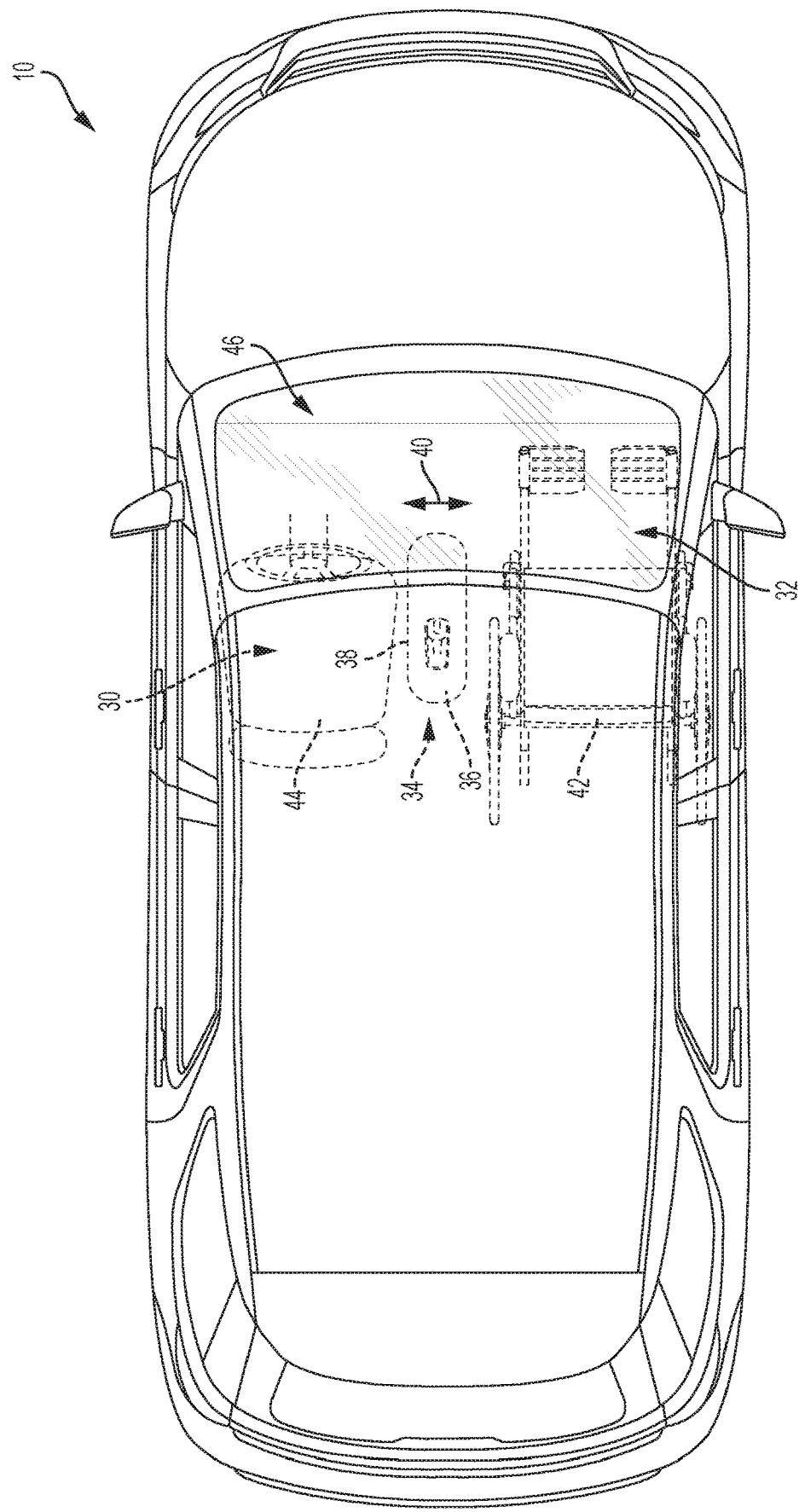
FIG. 2 illustrates a top plan sectioned view of a sport utility vehicle including a positionable shifter assembly.

Over the past few years, the number of wheelchaired individuals who desire to lead full active lives has increased. To accommodate such individuals, the SUV has become a preferred vehicle of choice, particularly with military veterans who received disabilities during their tours of duty. Consequently, the SUV 10 is further modified or retrofitted as illustrated in FIG. 2 to provide a location for the wheelchaired passenger to be located in the front passenger compartment at either a driver side location 30 or a passenger side location 32, next the driver. To retrofit the vehicle 10, a manufactured SUV is purchased from a dealer or directly from the manufacturer, and in one embodiment, the manufacturer supplied center console is disassembled or removed from the vehicle. In particular, the original shifter is separated from other manufacturer supplied components and reused and located in the front passenger compartment in a positionable shifter assembly 34, as described herein.

As can be seen in FIG. 2, the driver side location 30 and the passenger side location 32 are located in a front passenger compartment on either side of the positionable shifter assembly 34, which includes a center console 36 and a shifter 38. In this embodiment, the shifter assembly 34 is configured to move along a line 40 such that the shifter assembly 34 is positionable within the front passenger compartment to either increase or decrease the amount of usable floor area in either of the driver side location 30 and the passenger side location 32. When moved closer to the driver side location 30, the passenger side position 32 is enlarged sufficiently to accommodate a wheelchair 42. In another embodiment, a seat 44 is removed and the shifter assembly 34 is moved toward the passenger side position 32 to accommodate the wheelchair 42 when located in the driver side location 30. While a positionable shifter assembly 34 is illustrated, in other embodiments, the original shifter assembly is not replaced, and remains fixed in the front passenger compartment.

Figure 3:
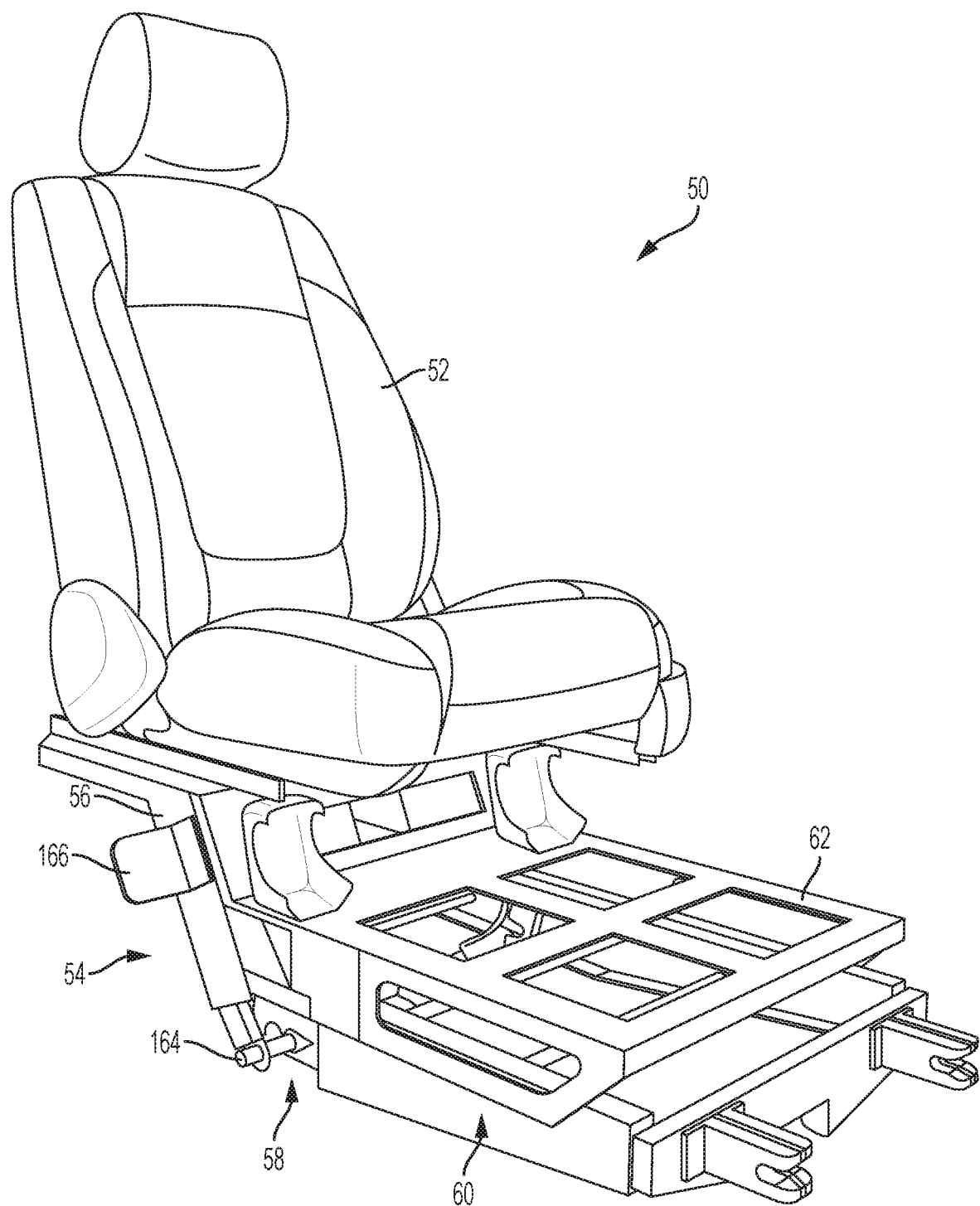
FIG. 3 illustrates a seat assembly.

The vehicle 10 is further retrofitted, in one embodiment, to enable both the driver side location 30 and the passenger side location 32 to include one of the wheelchair 42 or a seat 44. In the event a seat 44 is desired in one of the locations 30 and 32, a seat assembly 50 of FIG. 3 is placed in a recessed area of one of the locations 30 and 32. The seat assembly 50 in other embodiments is located in both positions, but one or both is removable to accommodate a wheelchaired passenger. The recessed area is formed during the retrofit of the vehicle to lower the floor. Each of the driver side location 30 and the passenger side location 32 includes the recessed area in one embodiment. In other embodiments, however, one recessed area is located at one of the driver side location 30 and the passenger side location 32, but not the other.

FIG. 3 illustrates the seat assembly 50 configured to be located in the driver side location 30. While a passenger side seat assembly is not discussed, the seat assembly 50 for a passenger side location 32 is substantially similar but is a mirrored configuration of the driver side seat assembly.

As illustrated in FIG. 3, the seat assembly 50 includes a seat 52 mounted to and supported by a base assembly 54. The base assembly 54 includes a riser 56 upon which the seat 52 is located. A lower seat base 58 supports the riser 56. In one embodiment, the seat 52 is configured to slide along the riser 56 to adjust the seat location within the driver side location 30.

Figure 4:
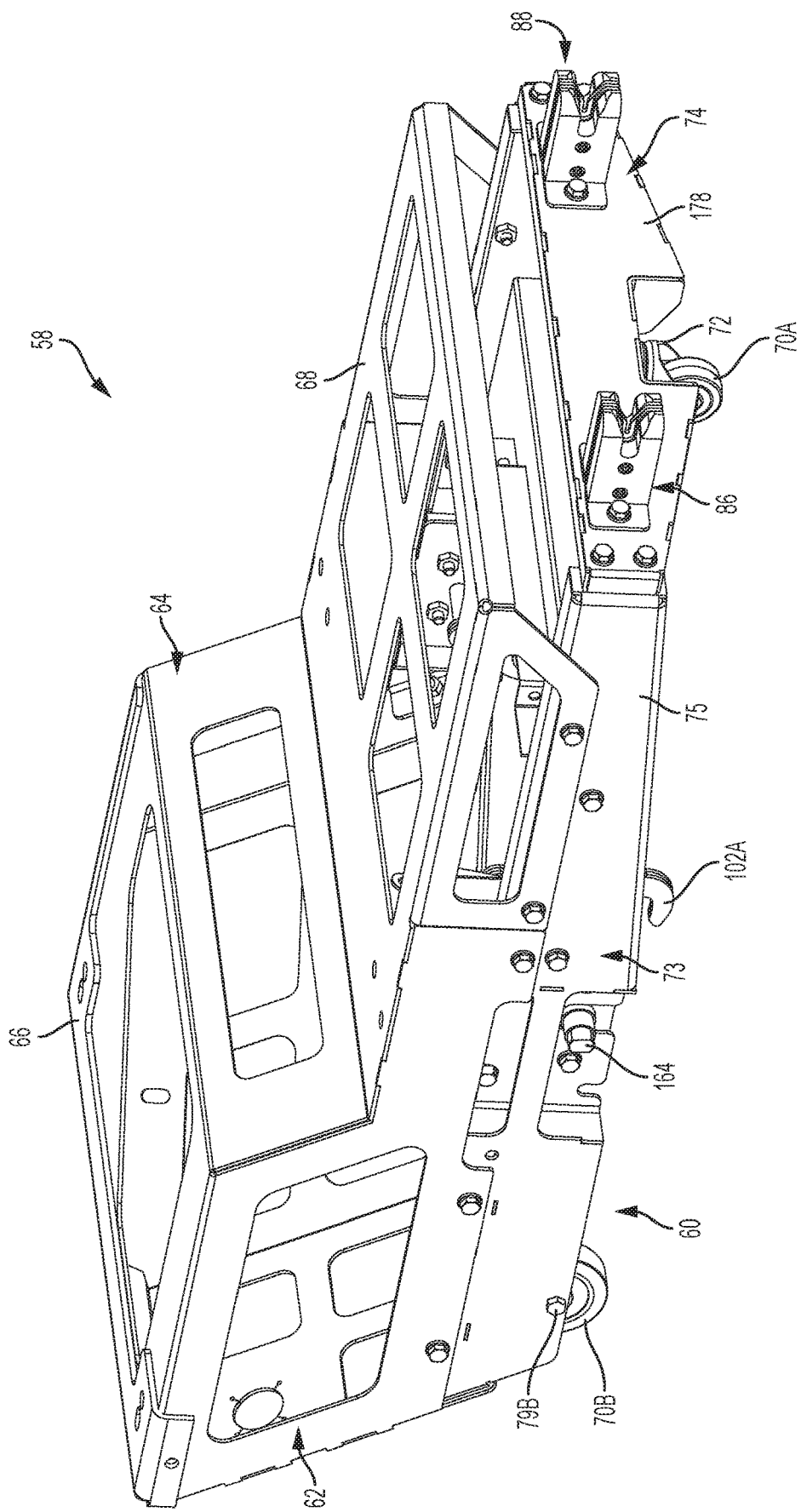
FIG. 4 illustrates a seat base assembly for the seat assembly of FIG. 3.

As further illustrated in FIG. 4, the lower seat base 58 includes a seat dolly 60 configured to support a frame structure 62. The frame structure 62 is coupled to and supports the riser 56 and the seat 52. The frame structure 62 includes a first portion 64 generally defining a first support surface 66 and a second portion 68. The first support surface 66 defines a generally planar support surface configured to support the seat 52 in a level position. The second portion 68 also defines a generally planar support surface which is configured to support a floor section upon which a passenger places their feet. In one embodiment, the second portion 68 is disposed slightly lower than a surrounding floor portion such that a floor insert placed on the second portion 68 provides a flush surface between the floor insert and surrounding floor. In different embodiments, the frame structure 62 includes one or more individual one-piece parts each of which are configured to provide a complete frame structure 62.

Figure 7:
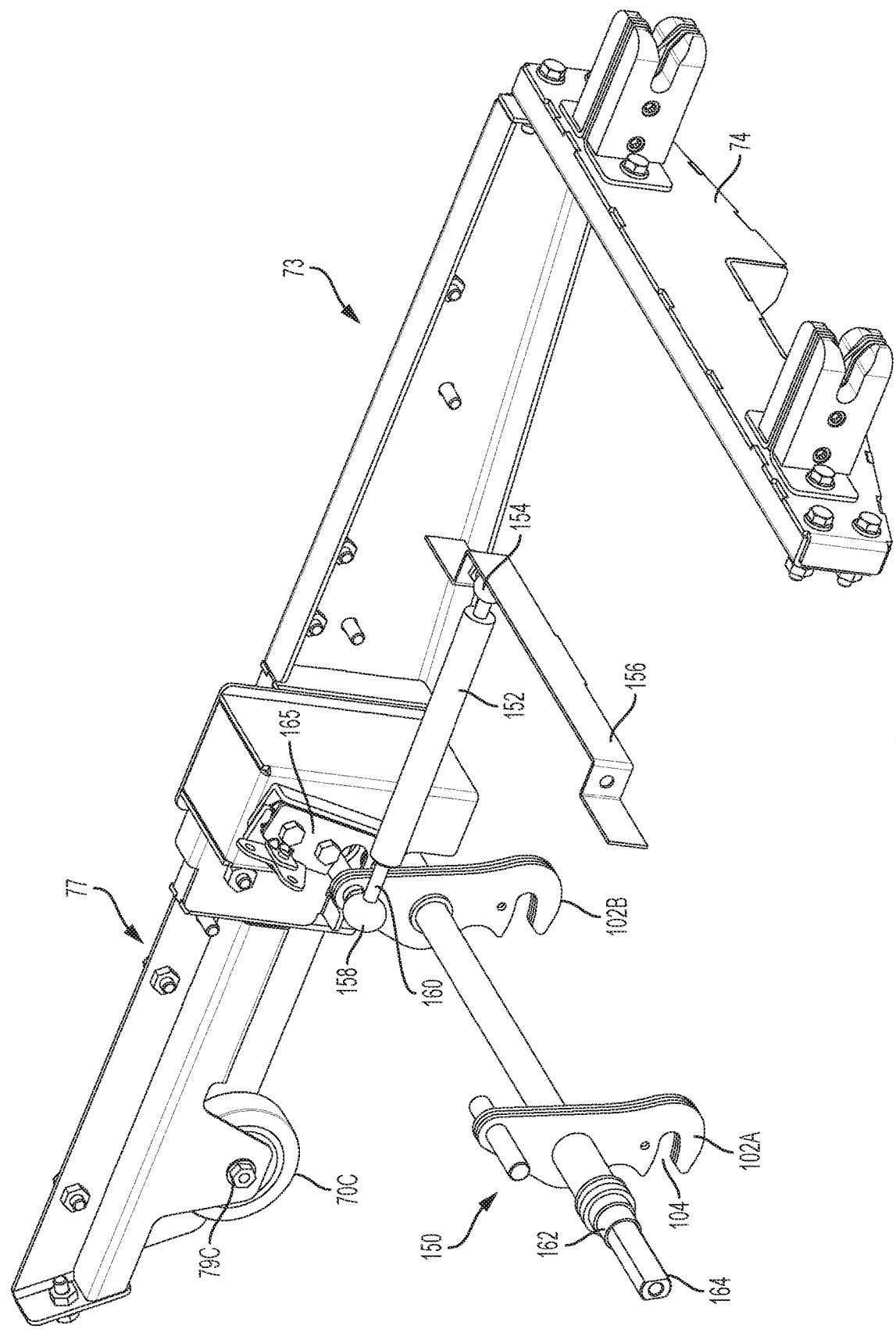
FIG. 7 illustrates a portion of the seat base assembly of FIG. 4.

The seat dolly 60 supports the frame structure 62 and includes a plurality of wheels 70A and 70B, which are shown in FIG. 4, and one additional wheel 70C as shown in FIG. 7. While the seat dolly 60 embodiment of FIGS. 4 and 7 includes three wheels 70, in different embodiments, different numbers of wheels are included. The wheel 70A is mounted to a swivel caster 72 at a front end 74 and the wheels 70B and 70C are mounted respectively on a rod 79B and 79C.

As shown in FIG. 4, the seat dolly 60 includes a frame 73 including a side 75 connected to the front end 74. While not shown in FIG. 4, the seat dolly 60 includes a rear end coupled to the side 75 and also coupled to a second side 77 of FIG. 7. In different embodiments, the frame 73 is made of one or more single piece parts.

Figure 5:
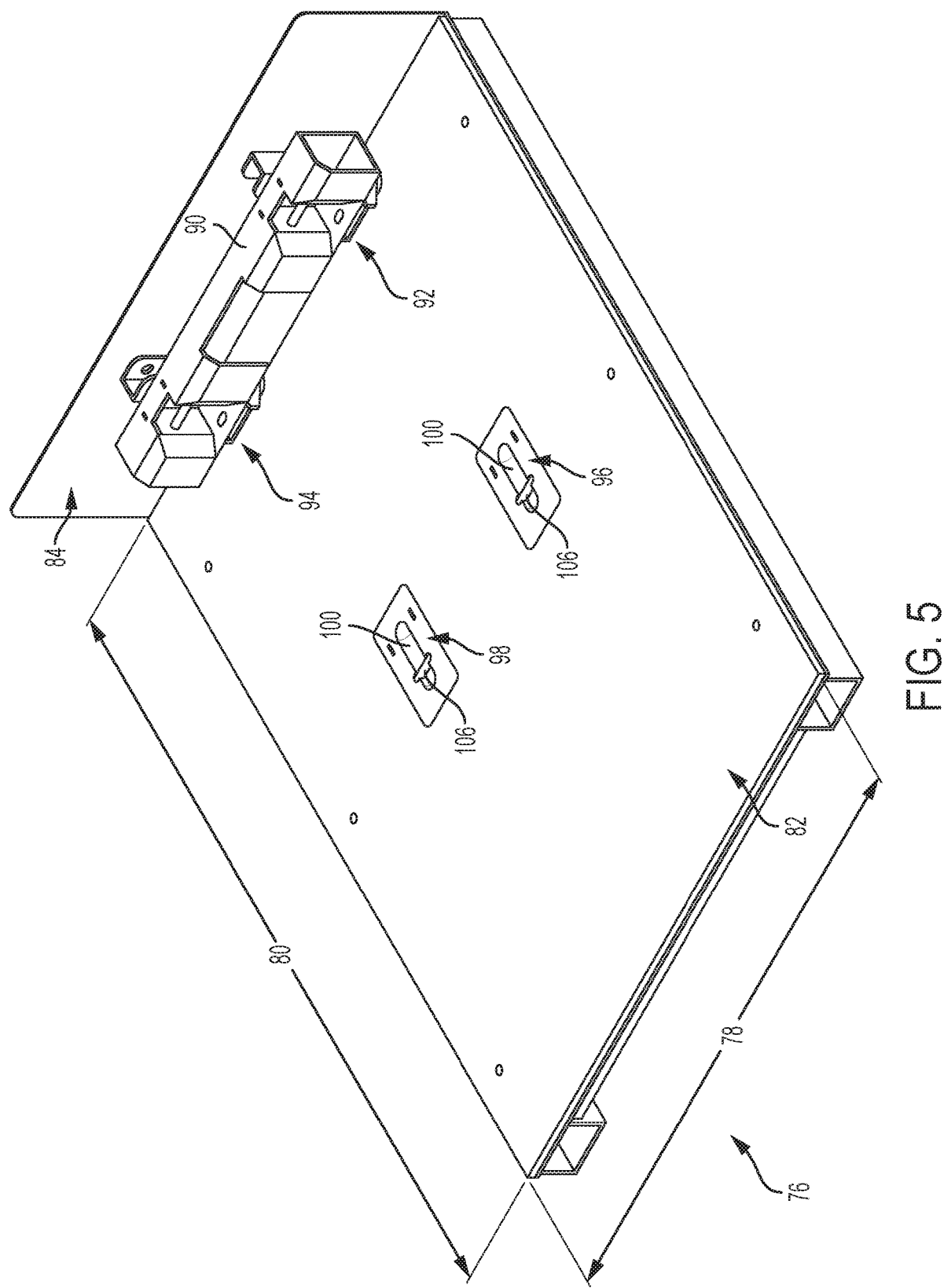
FIG. 5 illustrates a floor base assembly.

FIG. 5 illustrates one embodiment of a floor base assembly 76 which is located in the recessed portion of the vehicle 10 and which is configured to fixedly locate the seat assembly 50 with respect to the vehicle 10. In the illustrated embodiment, the floor base assembly 76 includes a width 78 and a length 80 which fits similar dimensions of the floor recess such that fixing the floor base assembly 76 to the vehicle recess requires reduced fastening requirements. The floor base assembly 76 includes a floor section 82 defining a substantially planar surface such that the seat assembly 50 is rolled onto the floor section 82 for locating the seat assembly 50 into position. Since the wheel 70A is caster mounted, the front end 74 of the dolly 60 is movable from side-to side to enable alignment of the seat assembly 50 with respect to the driver side location 30, where the floor base assembly 76 is located.

The wheel 70A provides for directional control of the front end 74 such that movement of the seat assembly 50 toward a front portion 84 engages a first mounting projection 86 and second mounting projection 88 (see FIG. 4) with a mounting bracket 90 of the floor base assembly 76. The mounting bracket 90 includes first and second receivers 92 and 94, each of which is configured to respectively receive the first mounting projection 86 and the second mounting projection 88. Once the seat assembly 50 has been moved forward to engage the projections 86 and 88 to the receivers 92 and 94, the seat dolly 60 is positioned to be fixed in place to the floor base assembly 76.

The floor section 82 includes a first recess 96 and a second recess 98. Each of the first and second recesses 96 and 98 define a cavity 100 which extends into the floor section 82 and which are configured to receive a first hook 102A (see FIG. 4) and a second hook 102B (see FIG. 7). Each of the hooks 102A and 102B includes a recess 104 which engage a pin 106 of the floor section 82. Engagement of the hooks 102 with the pins 106 holds the seat assembly 50 in place with respect to the floor base assembly 76.

Figure 6:
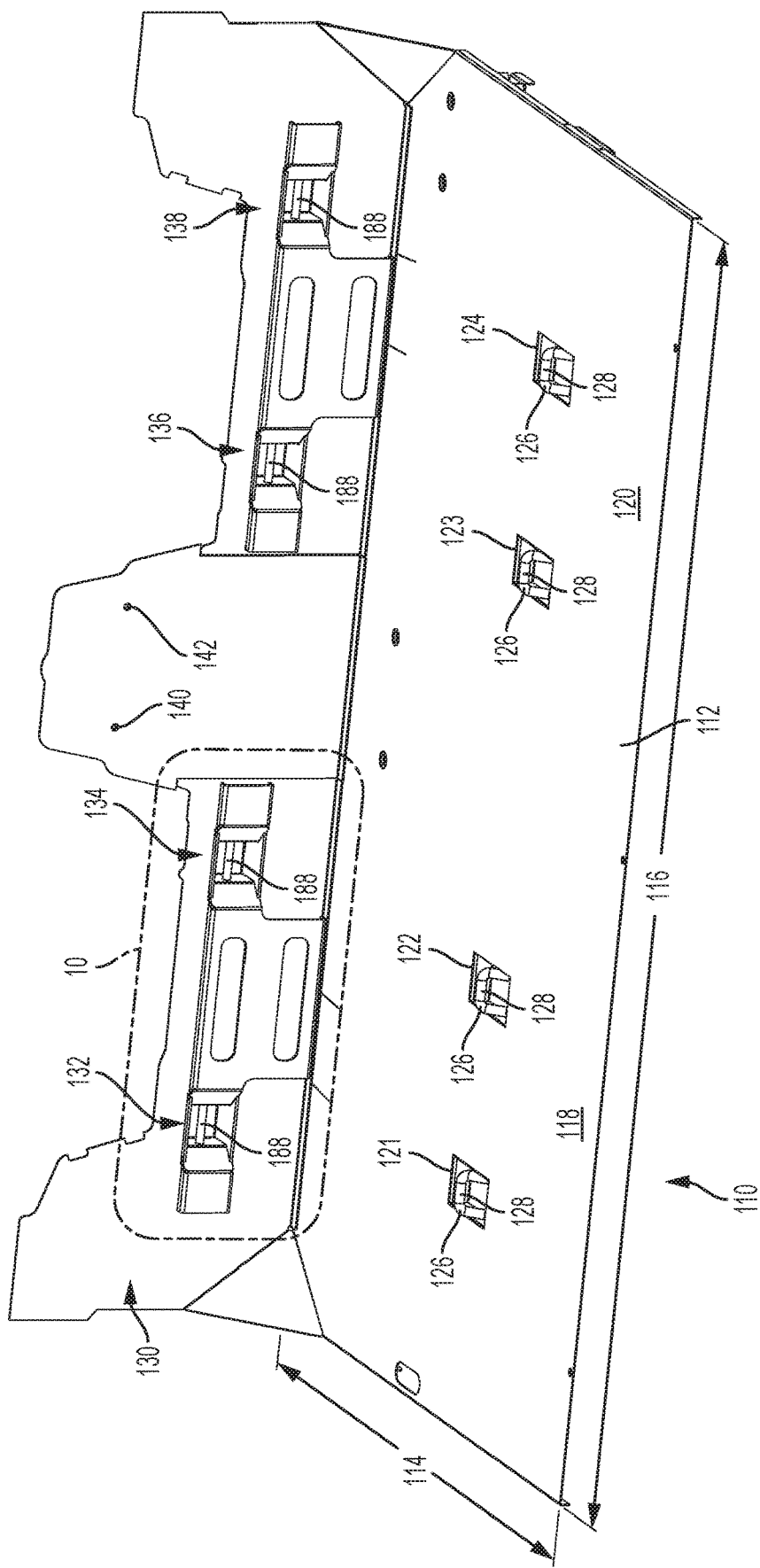
FIG. 6 illustrates another embodiment of a floor base assembly.

FIG. 6 illustrates another embodiment of a floor base assembly 110 which includes a floor section 112 having a length 114, similar in length to the length 80 of the floor base assembly 76 of FIG. 5. A width 116 of the floor section 112 is longer than the width 78 of the floor section 82 and is sufficient to provide a driver side locating area 118 and a passenger side locating area 120. The floor section 112 includes a first, second, third, and fourth locating recesses 121, 122, 123, and 124. Each of the recesses defines a cavity and each is configured to accept the hooks of the seat dolly 60. Each of the recesses includes a U-shaped member 126 including an engaging pin 128 which is engaged by one of the hooks of the seat dolly 60. In the illustrated embodiment, an end of the U-shaped member 126, opposite the engaging pins 128, is rotatably coupled to the floor section 112. Engagement of the hook to the engaging pin 128, thereby moves the members U-shaped 126 such that an engagement pressure is applied by the hook to the U-shaped member 126 to maintain a pressurized contact therebetween. When not engaged by the hooks of the seat dolly 60, the U-shaped members move into the respective recesses so as not to obstruct items, materials, or persons located on the floor section 112.

As with the floor base assembly 76, the floor base assembly 110 includes a mounting bracket 130, which includes first, second, third and fourth receivers 132, 134, 136, and 138, each of which is configured to engage one of the mounting projections. For instance, the first and second receivers 132 and 134 are configured to receive the first mounting projection 86 and the second mounting projection 88 of FIG. 4. If a passenger side seat assembly is provided, the passenger side seat assembly includes similar projections each of which is configured to engage the receivers 136 and 138.

The mounting bracket 130 extends from and substantially perpendicular to floor section 112. The mounting bracket 130 includes one or more single part pieces arranged to provide the receivers. Each of the receivers 132, 134, 136, and 138 define a recess into which the mounting projections extend when the seat assembly is fixed in place on the floor section 112 through engagement of the hooks 102 to the U-shaped members 126. The mounting bracket 130, in one embodiment, is connected to the firewall of the vehicle 10. In the illustrated embodiment, the bracket 130 includes a first aperture 140 and a second aperture 142 which receive a connector to thereby fixedly connect the floor base assembly 110 to the firewall.

FIG. 7 illustrates a portion of the frame 73 of the seat dolly 60 having the front end 74 and the second side 77. The first side 75 and a back bracket are removed for illustrating further details of the seat dolly 60. The frame 73 supports a latch assembly 150 which includes a mechanical actuator 152 having a first end 154 coupled to a support bracket 156 and a second end 158 rotatably coupled to the hook 102B at the first end 158. The mechanical actuator 152, in one embodiment as illustrated, includes a hydraulic cylinder having a cylinder rod 160 defining the second end 158.

A rod 162 extends from one side to the other side of the frame 73 and is rotatably supported by the frame 73. An end 164 extends past the first side 75 (see FIG. 4) to be accessible to a user of the seat assembly 50. In the embodiment of FIG. 1, an actuator 166 is fixedly coupled to the end 164. At this location, the actuator 166 is between the driver side area and passenger side area. Movement of the actuator 166 engages and disengages the hooks 102A and 102 B with a respective pin 106 or a respective U-shaped member 126. The other end (not shown) of the rod 162 extend into and is supported by a stiffener bracket 165. In other embodiments, the actuator 166 is located on an opposite side of the illustrated seat assembly 60, between a door and the seat assembly 60.

Each of the hooks 102A and 102B are fixedly coupled to the rod 162 such that rotation of the rod 162 about the axis thereof moves the hooks 102 into and out of engagement with the pins or U-shaped members. Rotation of the rod 162 in a counterclockwise direction as illustrated moves hooks 102A away from the pins or U-shaped members to enable movement of the seat assembly 50 from the fixed location. Rotation of the rod 162 in the clockwise direction moves the hooks 102A toward the pins or U-shaped members to fix the location of the seat assembly 50 with the base.

Figure 8:
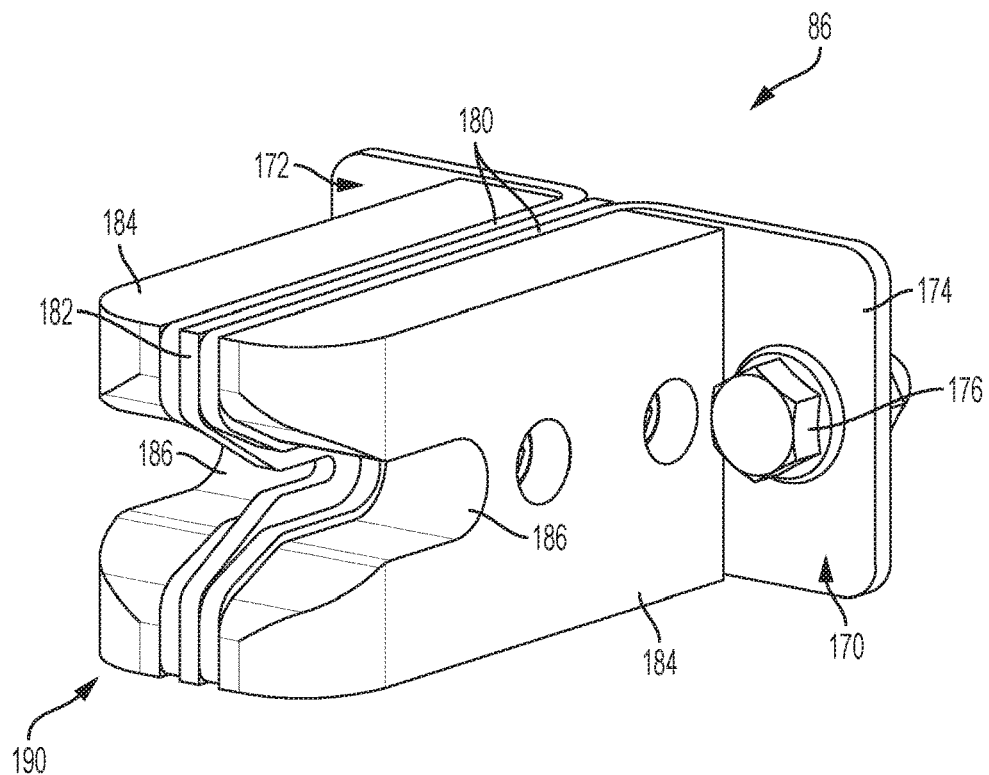
FIG. 8 illustrates one embodiment of a mounting projection.

FIG. 8 illustrates one embodiment of the mounting projection 86 of FIG. 4. Mounting projection 88 is similarly configured as projection 86 and the discussion with regard to projection 86 of FIG. 8 similarly describes the projection 88. As illustrated in FIG. 8, the mounting projection 86 includes a first mounting bracket 170 and a second mounting bracket 172. Each of the brackets 170 and 172 are similarly configured and include a right angle configuration in which a first portion 174 includes an aperture through which a connector 176 is inserted into a front bracket 178 of front end 74 of FIG. 4. A second portion 180 extends from the first portion 174 at a substantially right angle. The second portion 180 of each of the brackets 170 and 172 are spaced a distance apart to define a space therebetween in which a resilient member 182 is located. Each of the second portions 178 are configured to support a guide piece 184, which are each coupled to one of the respective brackets 170 and 174.

Figure 9:
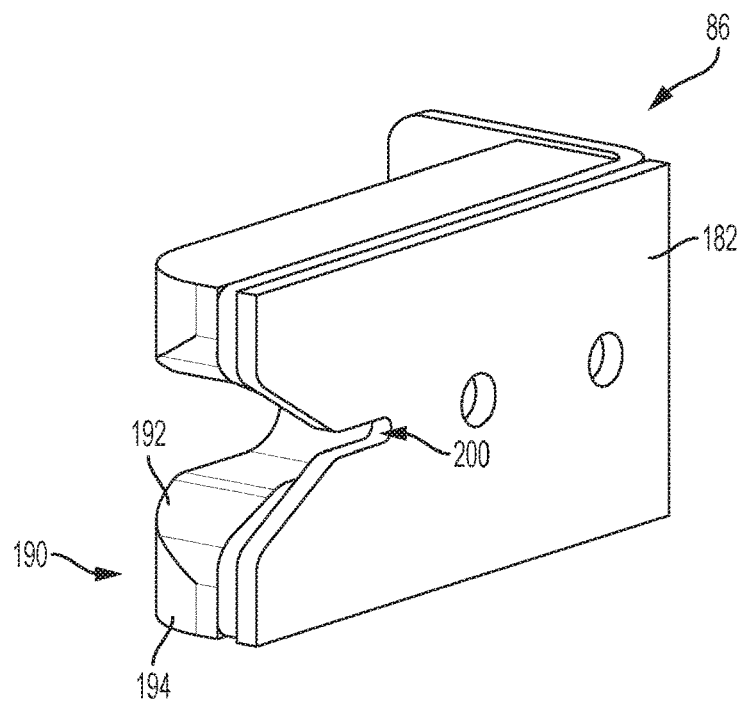
FIG. 9 illustrates a portion of the mounting projection of FIG. 8.
Figure 10:
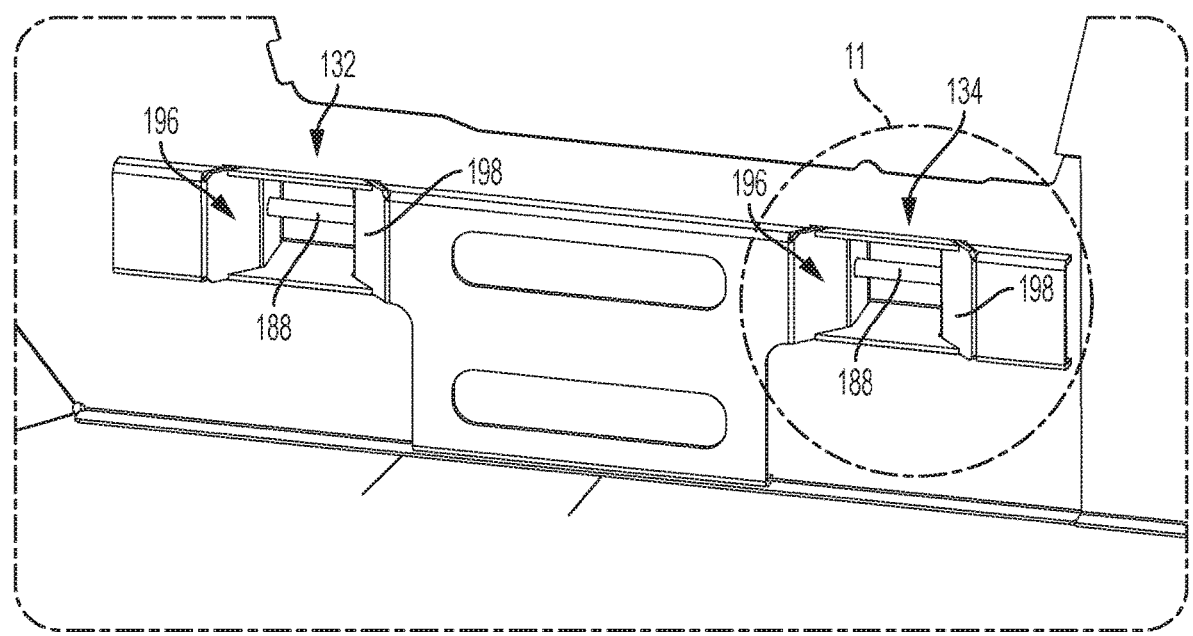
FIG. 10 illustrates a portion of a seat base assembly including receivers.
Figure 11:
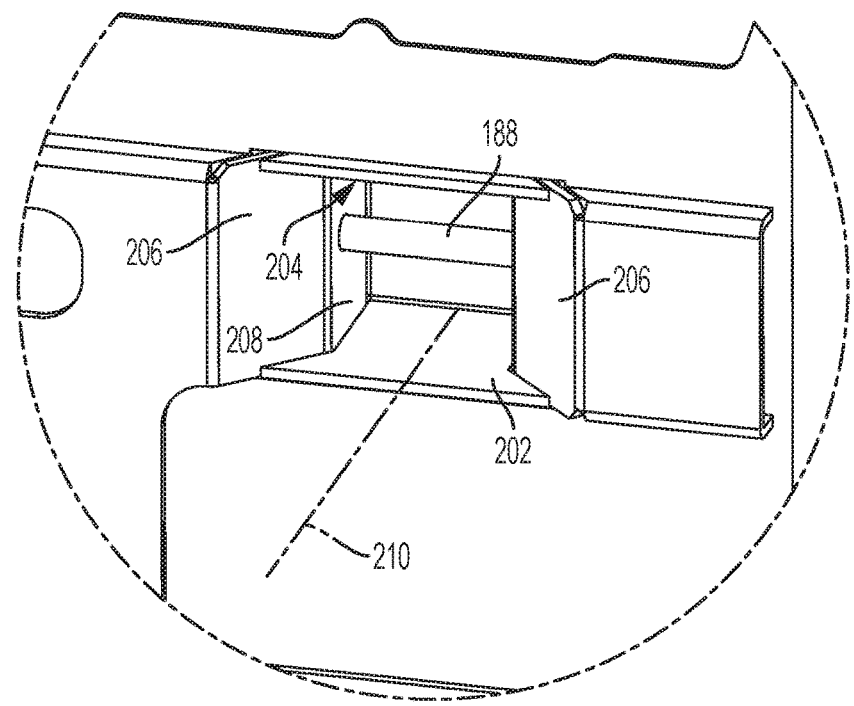
FIG. 11 illustrates a receiver of FIG. 10.

As seen in FIGS. 8 and 9, each of the guide pieces 184 include a groove 186 configured to accept a pin 188 of the receivers 132 and 134 as illustrated in FIG. 6 and as further described in FIGS. 10 and 11. The groove 186 includes a front portion 190 configured to guide the receivers into engagement with the pin 188. The front portion 190 includes a first guide feature 192 which provides a first ramp structure to guide the projection 86 and 88 into engagement with the pin 188. A second guide feature 194 includes a second ramp structure to guide the projections 86 and 88 into the appropriate receiver through guiding contact with a side wall 196 and 198 (see FIG. 10). If the alignment of the seat dolly 60 is slightly offset from the receivers, the first and second guide features 192 and 194 direct the mounting projection into alignment with the receivers as the seat dolly 60 is moved forward to locate the pins 188 into the groove 186.

The resilient member 182 includes a channel 200 having a width dimension less than a width dimension of the groove 186. The width dimension of the groove 186 is the same dimension or slightly larger as a diameter of the pin 188. The width dimension of the channel 200, however, is less than the diameter of the pin 188. Consequently, as the dolly 60 is moved toward the receivers, the channel 200 of resilient member 182 expands from the engagement with the pin 188. The pin compresses with structure of the member 182 and provides a press fit with the pin 188. Once the dolly 60 is aligned with the base, movement of the actuator 166 engages the channel 200 into further engagement with the pin 188. The compression fit between the channel 200 and the pin 188 restricts movement of the dolly 60 with respect to the base and absorbs road conditions to provide a passenger with a relatively vibration-free anti-rattle seating arrangement.

In one embodiment, the resilient member 182 is made of rubber, a rubber compound, or a reinforced rubber. In additional embodiments, the guide pieces 184 are made of a plastic or a reinforced plastic. In other embodiments, the resilient member 182 and guide pieces 184 are made of a single one piece molded part having a similar shape to the multiple piece projection. The material of the single piece part is selected to provide for the features described above.

FIGS. 10 and 11 illustrate the receivers 132 and 134 (see FIG. 60, each of which is similarly configured. As described above, each of the receivers includes the pin 188, the side wall 196, and the side wall 198. Each of the side walls 196 and 198 are similarly configured to define a recess into which the projections are received. The recess includes a floor 202 and a ceiling 204, each of which is connected to the side walls 196 and 198. Each of the side walls 196 and 198 include a first planar portion 206 and a second planar portion 208, each of which are inclined with respect to a central axis 210. The angle of the first planar portion 206 with respect to the central axis 210 is greater than the angle of the second planar portion 208 with respect to the central axis 210, such that insertion of the projection into a recess is progressively directed to a central location within the recess.

As described herein, the seat assembly provides an improved configuration for a retrofitted vehicle. In particular, the seat assembly, while described as being located in either the driver side location or the front passenger side location, in other embodiments, the seat assembly is located in one or more other passenger locations within a vehicle. The seat assembly, therefore, provides a configurable vehicle designed to accommodate individuals of different physical capabilities. In addition, the vehicle is configurable to a vehicle seating only physically capable individuals, in the event that the physical limited individual continues to improve and no longer requires wheelchair transportation.

In another embodiment of the present disclosure, the vehicle of FIG. 1 may be modified further to open a B-pillar area (i.e., part of the vehicle frame between the front passenger door 18 and the rear passenger door 20. In doing so, ingress and egress of the wheelchair is made easier. In this embodiment, a modified seat base assembly may have increased maneuverability to provide additional space in the interior of the vehicle for the wheelchaired passenger. The seat base assembly may be located on either the driver's or passenger's side of the vehicle, and in particular, in either location 30 or 32 of FIG. 2. The seat base may be articulated either manually or automatically. For example, a handle may be provided on the seat base in which a user may use to articulate the seat base. The handle can be coupled to a cable that releases a latch on the seat base and allows the seat and seat base to lift upwards and pivot forward from the vehicle floor.

As shown in FIG. 12A, a perspective top view of a seat base assembly 1200 is shown including an upper seat base assembly 1202 and a lower seat base assembly 1204. The lower seat base assembly 1204 may be coupled to the floor of the vehicle. The upper seat base assembly 1202 may be pivotably coupled to the lower seat base assembly 1204. A seat, such as seat 52 in FIG. 3, may be coupled to the upper seat base assembly 1202 in any conventional manner.

FIG. 12B illustrates a perspective bottom view of the seat base assembly 1200 including the upper seat base assembly 1202 and the lower seat base assembly 1204.

Figure 12C:
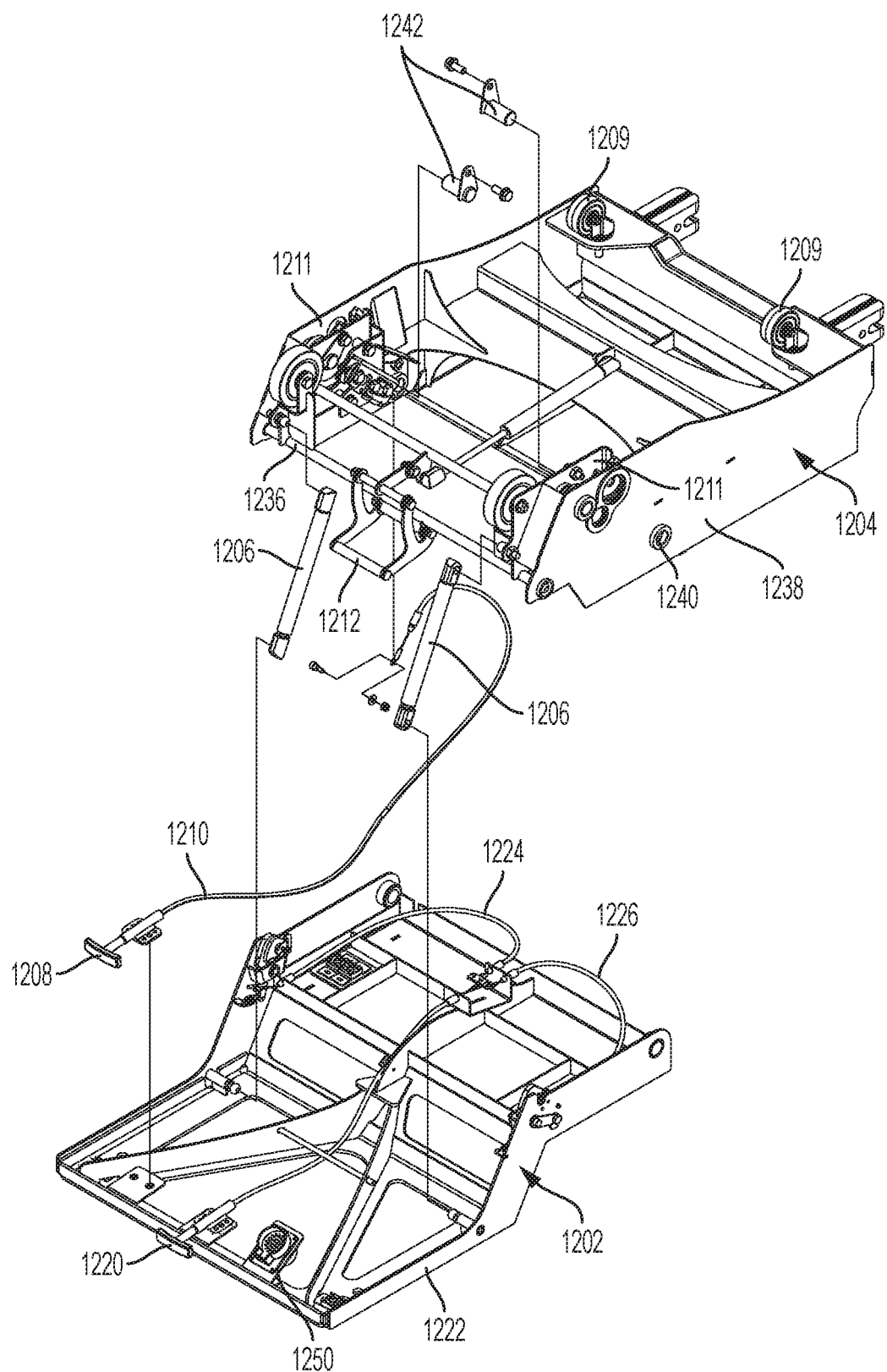
FIG. 12C illustrates an exploded perspective top view of seat base assembly capable of articulating including a lower seat base assembly and an upper seat base assembly.

As further illustrated in FIG. 12C, an exploded perspective bottom view of seat base assembly capable of articulating including the lower seat base assembly 1204 and the upper seat base assembly 1202 is shown.

A floor latch 1212 may be located on the lower seat base assembly 1204 for latching the seat base assembly 1200 to the floor base assembly 76. The floor latch 1212 is pulled up to release the seat base assembly from the floor base assembly 76 for removing the assembly 1200 from the vehicle. The assembly 1200 is re-engaged with the floor base assembly 76 by appropriately locating the assembly 1200 by pushing down on the latch 1212, typically by pressure applied by the foot of user. In one embodiment, the lower seat base assembly 1204 includes first and second mounting projections 1207 configured to engage first and second receivers, such as first and second receivers 92 and 94 of FIG. 5.

As shown in FIGS. 12A, 12B, and 12C, a pair of actuators 1206 may be pivotably coupled to the upper seat base assembly 1202 and the lower seat base assembly 1204. The actuators 1206, which may be electric, hydraulic, mechanical, or any known type of actuator, may extend to articulate the upper seat base assembly 1202 upwards and pivot it forward toward a front end of the vehicle. In doing so, additional space behind the seat is provided for a wheelchair to more easily fit within the interior of the vehicle. In one embodiment, the actuators 1206 are compression gas cylinders which when released from a compressed state move the upper seat base assembly 1202 away from the lower seat base assembly 1204 about a pivot. As the gas cylinders release, the seat tilts with respect to the lower seat base assembly 1204 and moves from a seated position to a tilted position.

To move the seat back to its seated or lowered position, the upper seat base assembly 1202 may be pushed down towards the vehicle floor and the weight of the seat base assembly can assist with this movement.

Besides articulating the upper seat base assembly 1202 between its forward position and lowered position, the entire seat assembly 1200 may be removed from the vehicle. A securing assembly includes a securing handle 1208 configured to actuate hooks (not shown), located in first and second catch assemblies 1211 of the lower frame assembly 1204. The hooks in different embodiments, are similar to or the same as the hooks 102A and 102B of FIG. 7. The hooks engage pins 100 of the floor base assembly 76 to secure the seat assembly 1200 to the floor. The hooks automatically engage the pins 100 when the seat is located at the base assembly 76. Pulling the handle 1208 away from the seat base assembly 1200 releases the hooks from the pins 100 to enable removal of the seat base assembly 1200. A cable 1210 is operatively connected to the hooks to release the hooks from being latched to the pins.

Figure 13:
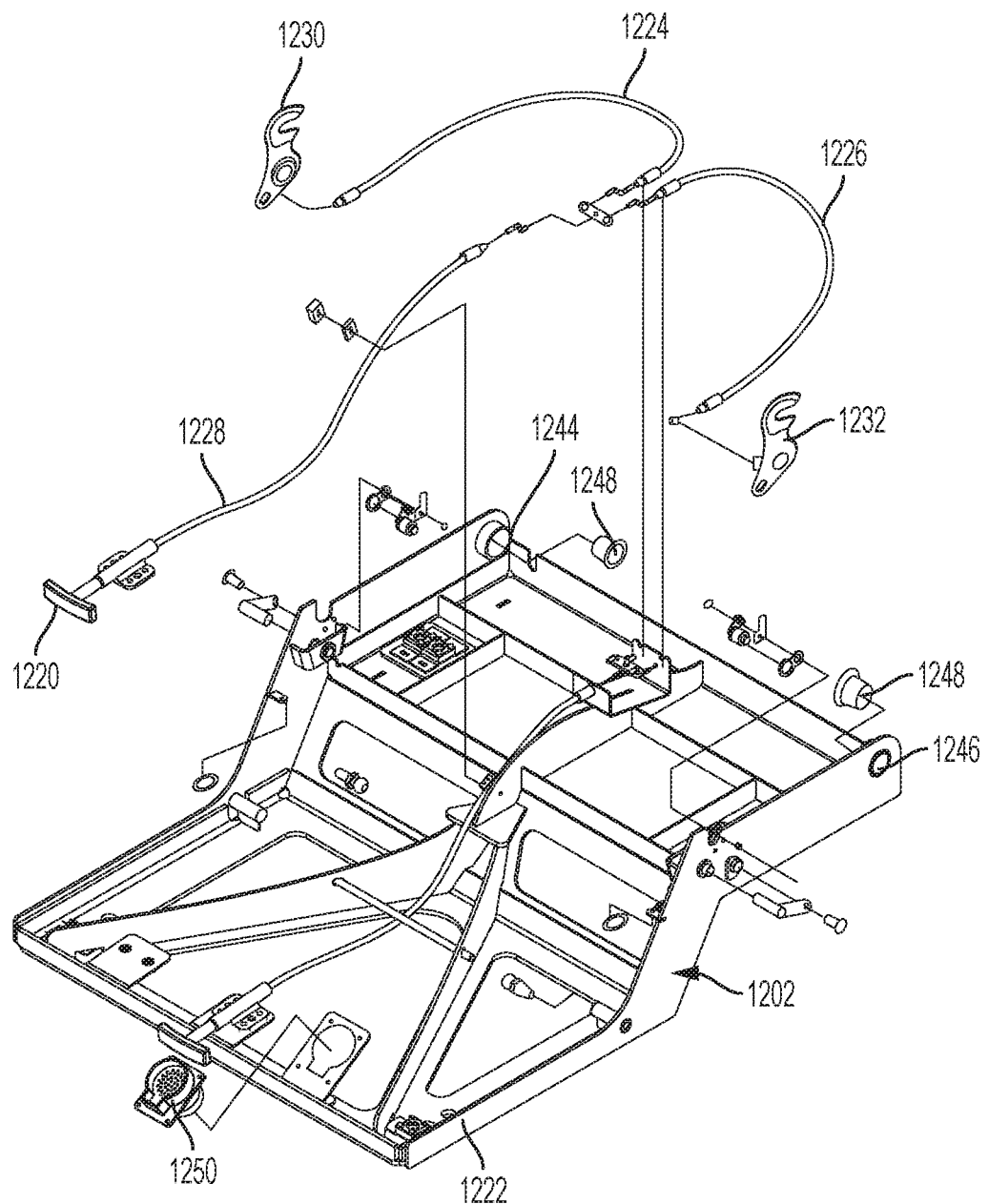
FIG. 13 illustrates an exploded perspective view of an upper seat base assembly.

FIG. 13 illustrates a tilt release mechanism of one embodiment including a handle 1220 which is coupled to a frame 1222 of the upper seat base assembly 1202. The handle 1208 and related cable 1210 are not shown in FIG. 13. The handle 1220 is coupled to a first tilt cable 1224 and a second tilt cable 1226 each of which is operatively connected to a cable 1228. Moving the handle, by pulling for instance, away from the frame 1222, adjusts the position of a first latch 1230 coupled to the cable 1224 and a second latch 1232 coupled to the cable 1226. As the handle 1220 is pulled away from the frame 1222, each of the first latch 1230 and the second latch 1232 rotate back, or in a counterclockwise direction as illustrated. The first latch 1230 and second latch 1232 are each rotatably connected to the frame 1222.

When the seat 52 is in the un-tilted or seated position, the first latch 1230 and the second latch 1232 each engage and are operatively connected to a rod 1236 of the lower seat base assembly 1204 as seen in FIG. 12C. By moving the handle 1220 away from the frame 1222, the latches 1230 and 1232 disengage from or are released from the rod 1236. The rod 1236 is supported by a frame 1238 of the lower seat base assembly 1204 and extends between sides thereof. As the latches 1230 and 1232 disengage from the rod 1236, the actuators 1206 are released from the compressed state and extend to tilt the upper support base 1202 with respect to the lower support base 1204. In other embodiments, the lower support base includes pins extending from the sidewalls of the frame 1238 which are engaged by the latches 1230 and 1232.

To return the seat to the seated position, downward pressure is applied to the seat to compress the actuators 1206, until the latches 1230 and 1232 engage the rod 1236. With sufficient pressure, the latches open to receive the rod 1236 and then close around the rod 1236 to maintain the seat in the seated position.

To provide for the tilting of the seat 54, the upper support base 1202 is pivotably coupled to the lower support base 1204, at a first pivot location 1240 (see FIG. 12C) and a second pivot location (not shown) on an opposite side of the frame 1238. A pair of pivot pins 1242 are located at the first pivot location 1240 and the second pivot location. The frame 1222 of the upper support base 1202 includes a first aperture 1244 and a second aperture 1246 each of which are sized to locate bushings 1248. The bushings 1248 are located in the apertures 1244 and 1246 and are configured to receive the pivot pins 1242. The first and second apertures 1244 and 1246 define an axis of rotation about which the upper support base 1202 tilts with respect to the lower support base 1204. The axis of rotation is generally horizontal with respect to the floor of the vehicle. In other embodiments, a rod extends between the first aperture 1244 and the second aperture 1246 to provide for inclining the upper base portion 1202 with the lower base portion 1204. A connector 1250 is supported by the frame 1222 to provide for a cable connection as would be understood by one skilled in the art.

Figure 14:
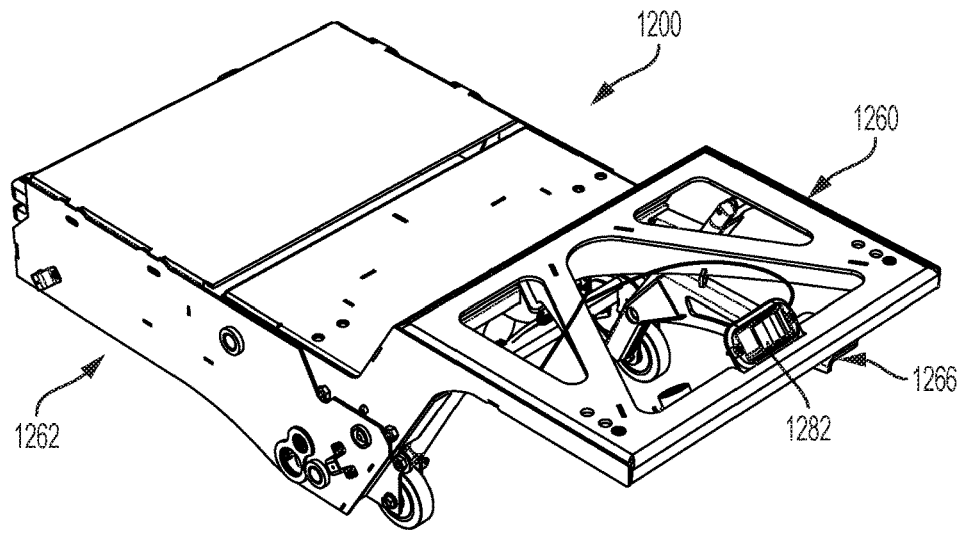
FIG. 14 illustrates another embodiment of a perspective top view of seat base assembly capable of articulating.
Figure 15:
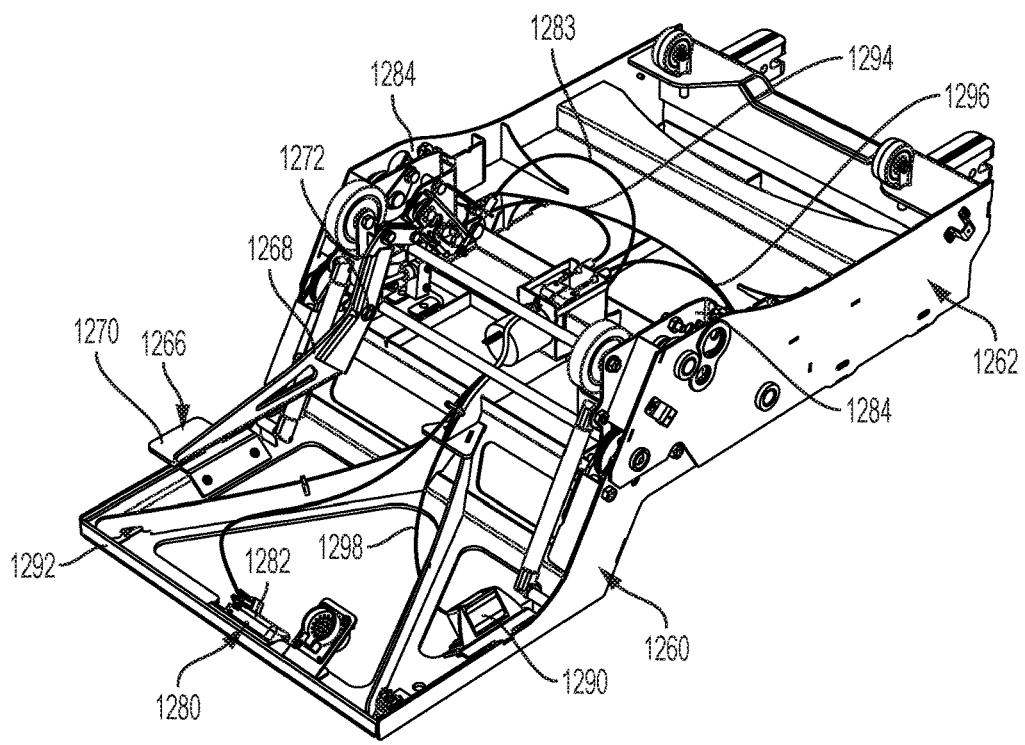
FIG. 15 illustrates a perspective bottom view of seat base assembly capable of articulating.

FIG. 14 illustrates a perspective top view of another embodiment of the seat base assembly 1200 including an upper seat base assembly 1260 and a lower seat base assembly 1262. The lower seat base assembly 1262 may be coupled to the floor of the vehicle. The upper seat base assembly 1260 may be pivotably coupled to the lower seat base assembly 1262. A seat, such as seat 52 in FIG. 3, may be coupled to the upper seat base assembly 1260 in any conventional manner. FIG. 15 illustrates a perspective bottom view of the assembly 1200 shown in FIG. 14.

As illustrated in FIG. 15 and FIGS. 16A-16C, a floor latch 1266 is operatively connected on the lower seat base assembly 1262 for latching seat base assembly 1200 to the floor base assembly 76. The floor latch 1266 is actuated by a foot of the user or by other means. The floor latch 1266 includes a connecting arm 1268 having a flange 1270 configured to actuate the latch 1266 with pressure. The floor latch 1266 is rotatably coupled to the frame of the lower seat base portion 1262 at a pivot location 1272. Downward pressure at the flange 1270 engages the lower seat based assembly to the floor as described above with regard to floor latch 1212.

Figure 16A:
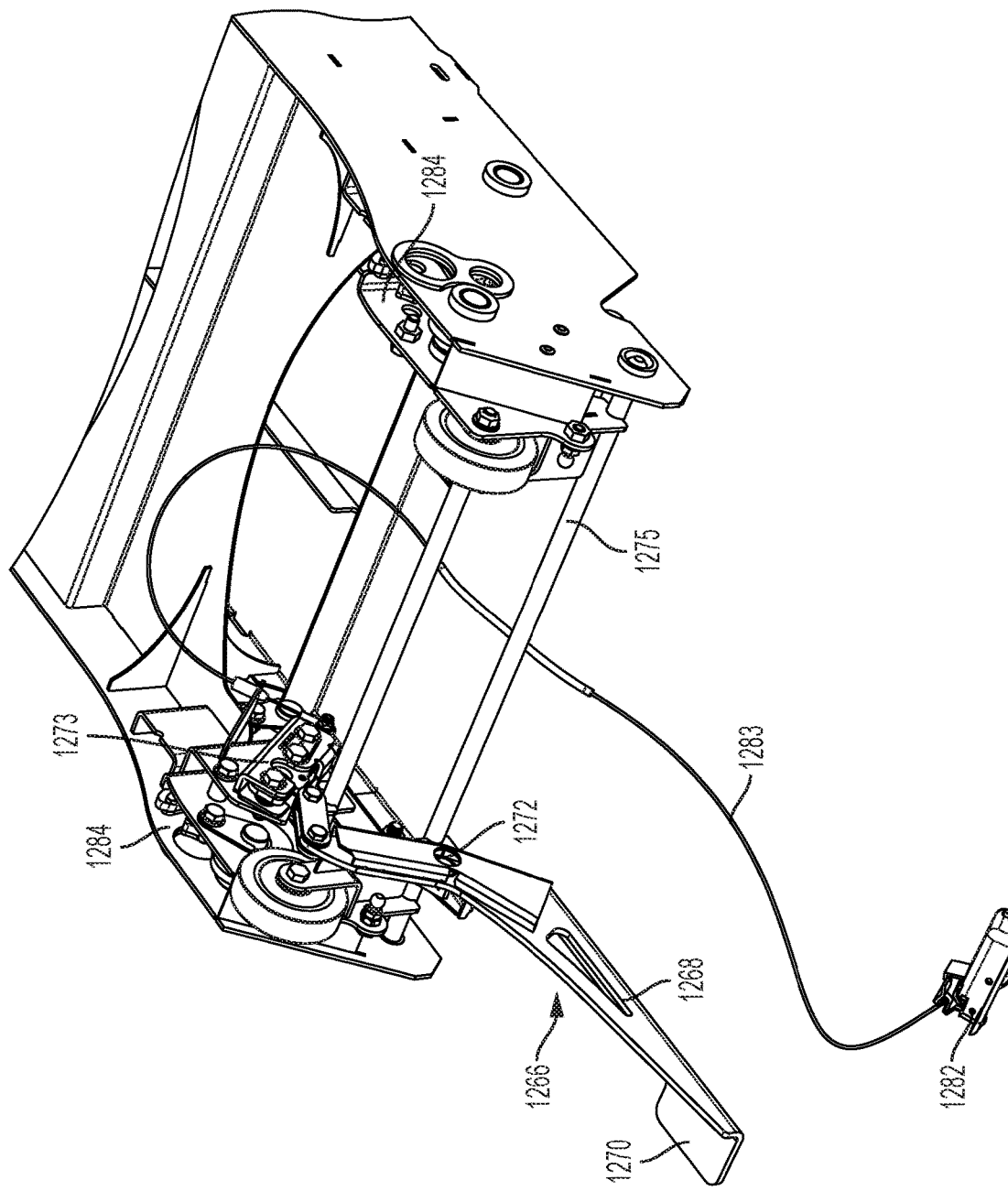
FIG. 16A illustrates a perspective bottom view of a foot pedal coupled to the seat base assembly of FIG. 15.
Figure 16B:
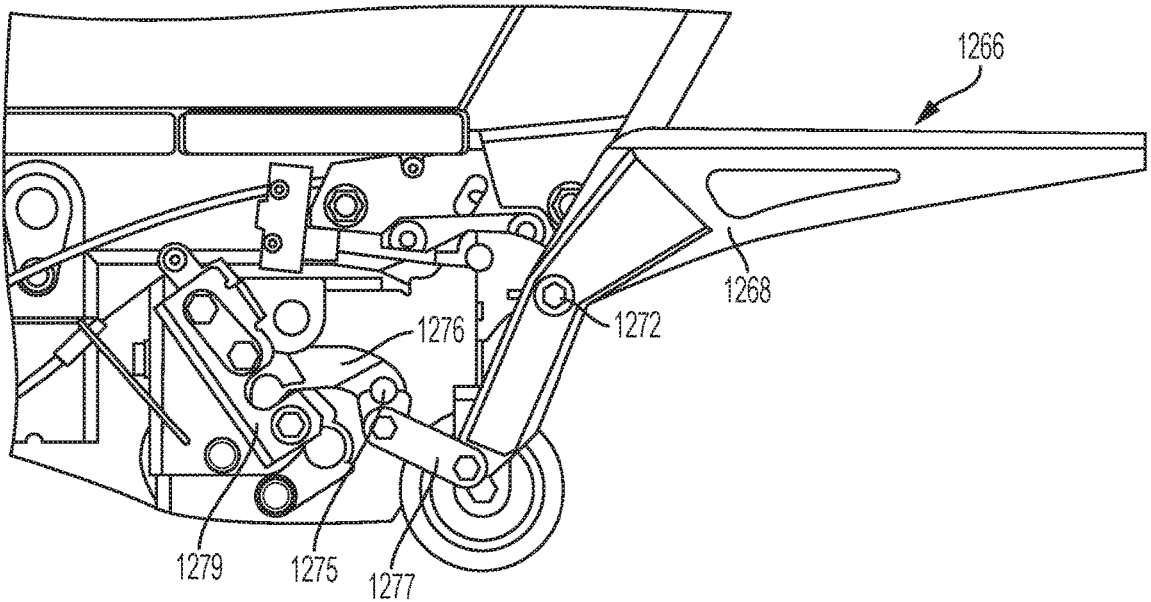
FIG. 16B illustrates a side view of a foot pedal actuator in a first position activated by a foot pedal.
Figure 16C:
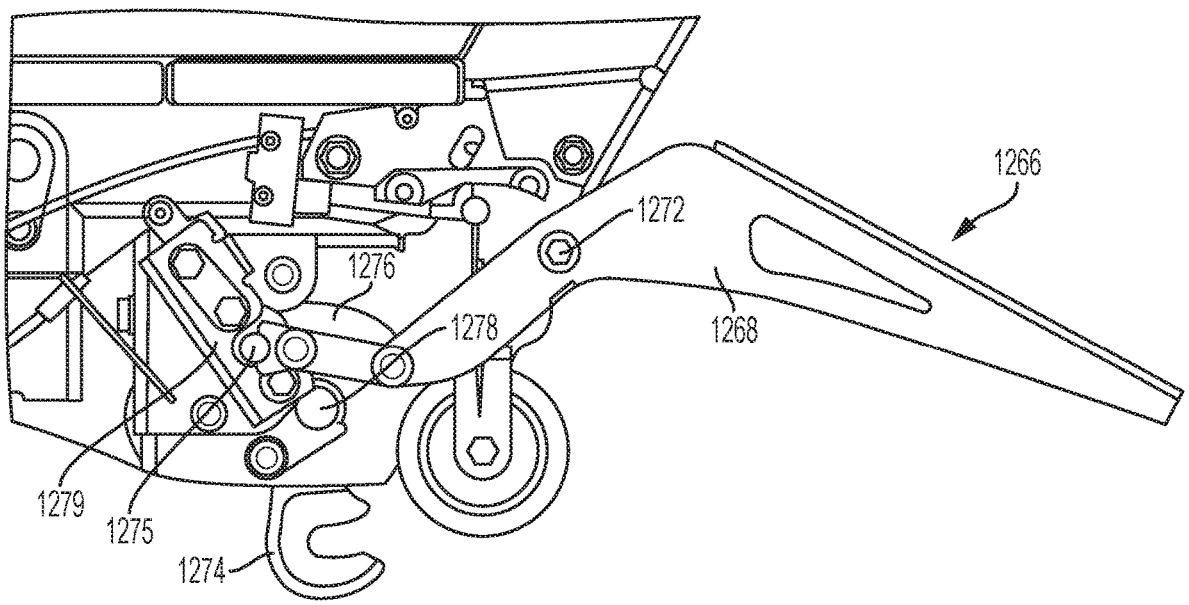
FIG. 16C illustrates a side view of a foot pedal actuator in a second position activated by a foot pedal.

FIG. 16A illustrates a perspective bottom view of the floor latch 1266 coupled to the seat base assembly of FIG. 15. The floor latch 1266 includes a latching mechanism 1273 further illustrated in a side view of FIG. 16B and of FIG. 16C. Upon activation of the connecting arm 1268, a hook 1274 is moved to engage the floor pin as shown in FIG. 16C to secure the seat to the floor. When the arm 1268 is pushed towards the floor, the arm 1268 rotates about the pivot 1272 and moves a rod 1275 through a path 1276 defined by the frame 1238 of the lower seat base assembly 1262. In one embodiment, the path 1276 is arcuate. Other configurations are contemplated. The rod 1275 extends between sides of the frame 1238 to actuate the hook 1274 and an additional hook (not shown) on the opposite side of the frame 1238. A linkage 1277 coupled to an end of the arm 1268 enables the pin 1275 to move along the path.

The arm 1274 is coupled to the pin 1275 and rotates about an axis 1278 where the arm 1274 is rotatably coupled to the frame 1238. As the pin 1275 moves to an end of the path 1276, the pin 1275 is captured by a clamp or latch 1279, where it is held until released.

A seat release assembly 1280 includes a seat release handle 1282 configured to release the hook 1274 and the other hook located on the rod 1275, each of which is located in first and second catch assemblies 1284 of the lower seat base assembly 1262. The seat release assembly 1280 functions in a fashion similar to the securing assembly and handle 1208 described above. The hooks, in different embodiments, are similar to or the same as the hooks 102A and 102B of FIG. 7. The hooks engage pins 100 of the floor base assembly 76 to secure the seat assembly 1200 to the floor. The hooks automatically engage the pins 100 when the seat is located at the base assembly 76. Pulling the handle 1282 away from the seat base assembly 1200 enables releasing the hooks 1274 from the pins 100 to provide for removal of the seat base assembly 1200. A cable 1283 is operatively connected to the clamp 1279 that is holding the rod 1275 to release the clamp 1279 from the rod 1275. Upon pulling of the handle 1282, the clamps 1279 are released from the rod 1275 to enable the rod to move along the path 1276. Once the rod 1275 is released, the user pulls up on the arm 1268 to unlatch the seat from the floor.

Figure 17:
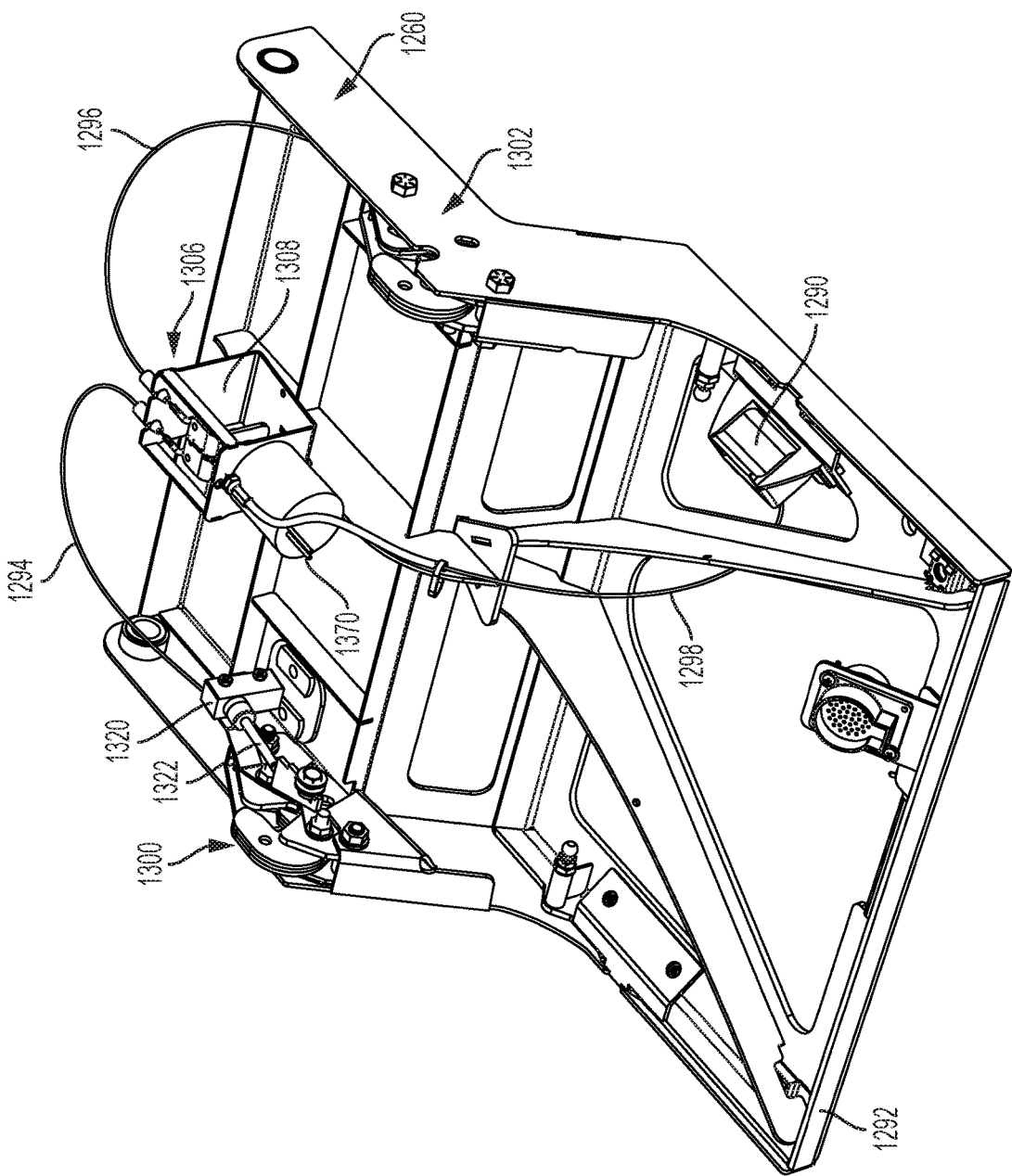
FIG. 17 illustrates a perspective bottom view of a tilt release mechanism coupled to the seat base assembly of FIG. 15.

FIG. 17 illustrates a tilt release mechanism including a tilt release handle 1290 which is coupled to a frame 1292 of the upper seat base assembly 1260. Certain components of FIG. 15 are not illustrated to better illustrate the tilt release mechanism. The handle 1290 is similar in function to the previously described handle 1220. In this embodiment, however the handle 1290 is moved from the location described for handle 1220, and is located to a side of upper seat base assembly 1260. The handle 1290 is coupled to a first tilt cable 1294 and a second tilt cable 1296 each of which is operatively connected to a cable 1298. Moving the handle, by pulling away from the frame 1292, for instance, adjusts the positions of a first latch 1300 coupled to the cable 1294 and a second latch 1302 coupled to the cable 1296. As the handle 1290 is pulled away from the frame 1292, each of the first latch 1300 and the second latch 1302 open to release the upper seat base assembly 1260 from the lower seat base assembly 1262. Actuators 1304 (see FIG. 15) provide for the relative movement between the upper seat base assembly 1260 and the lower seat base assembly 1262 as previously described.

In one embodiment, the latches 1300 and 1302 are latch/latch-pawl type of latch which provide a positive lock of the upper seat base assembly 1260 to the lower seat base assembly 1262.

The cable 1298 is coupled to a cable terminal device 1306, having a housing 1308, which provides for a connection between the cable 1298 and the cables 1294 and 1296 to operate the latches 1300 and 1302. A rocker switch and solenoid circuit 1310 is coupled to the housing 1308 and to each of the cables 1294 and 1296. The rocker switch is electrically coupled to the vehicle control system, which is configured to transmit a signal to the rocker switch to activate the tilt function of the seat. In one embodiment, the control system includes user selectable input device, such as a switch or a graphical user interface, to actuate the latches 1300 and 1302 to move the seat to the tilted position.

A tilt indicator 1320 is coupled to the frame 1292 of the upper seat base assembly 1260 to indicate to the vehicle control system that the seat is in either the seated position or the tilted position. The tilt indicator includes an arm 1322, which depending on an orientation thereof, provides an electrical signal indicating the position of the seat. When the seat is in the seated position, the arm 1322 of the tilt indicator contacts a part of the lower seat base assembly 1262 to indicate the seat is in the seated position. Once the seat is released to the tilted position, the arm 1322 moves away from and out of contact with the lower seat base assembly 1262 to indicate that the seat has moved to the tilted position. In one embodiment, the tilt indicator 1320 includes a "wobble" style switch, the electrical state of which is provided to the control system. If the tilt indicator 1320 indicates that the seat is in the tilted position, the control system prevents the vehicle transmission from shifting from park to another gear, such as drive or reverse.

In a further embodiment, electronic controls may control the articulating movement of the seat base assembly. Moreover, the latches 1220 or 1290 in different embodiments are an electromagnetic latch or any other known type of latch. A controller such as on a keychain or inside the vehicle may include a button that releases the latch to allow the upper seat base assembly to articulate. A second button may control the other latch for removing the seat entirely from the vehicle.

In yet a further embodiment, the latches 1220 or 1290, or seat base assembly 1200 may be interlocked with a function of the vehicle for safety reasons. For example, either the latch 1220, 1290, or assembly 1200 may be interlocked with a transmission of the vehicle. Controls software may limit the function of the transmission (i.e., prevent it from being shifted into a forward or reverse range, or simply out of park or neutral) until the upper seat base assembly is securely latched to the lower seat base assembly. Moreover, a similar limitation of functionality may be used to ensure the entire seat base assembly is securely coupled to the vehicle floor.

While transmission functionality is only one example of how controls software may limit functionality of the vehicle, other examples may include reducing or limiting engine speed, engine torque, shutting off the ignition, and any other type of limitation that may be incorporated into the vehicle.

While exemplary embodiments incorporating the principles of the present invention have been disclosed herein, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

The invention claimed is:

1. A seat base assembly for a vehicle having a floor, the seat base assembly comprising:
    a lower seat base assembly configured to be coupled to the floor;
    an upper seat base assembly pivotably coupled to the lower seat base assembly;
    a latch coupled to one of the upper seat base assembly and the lower seat base assembly;
    a tilt release operatively coupled to the latch;
    an actuator coupled to the upper seat base assembly and the lower seat assembly, wherein the tilt release actuates the latch and enables movement of the actuator from a retracted position to an extended position to tilt the upper seat base assembly with respect to the lower seat base assembly; and
    a floor latch operatively connected to the lower seat base assembly, wherein actuation of the floor latch places the lower seat base assembly in a secured position of the floor.

2. The seat base assembly of claim 1 wherein the lower floor base assembly includes a mounting projection configured to engage receivers located at the floor upon movement of the floor latch.

3. The seat base assembly of claim 1 further comprising a seat release handle operatively connected to a securing assembly having hooks, wherein the seat release handle adjusts the position of the hooks to provide for removal of the seat base assembly from the floor of the vehicle.

4. The seat base assembly of claim 3 wherein the actuator includes a compression cylinder having one end coupled to the lower seat base assembly and another end coupled to the upper seat base assembly.

5. The seat base assembly of claim 1 further comprising a rod coupled to one of the upper seat base assembly and the lower seat base assembly, wherein the latch engages the rod to maintain the upper seat base assembly in a seated position and is disengaged from the rod upon actuation of the tilt release to move the upper seat base assembly to a tilted position.

6. The seat base assembly of claim 5 wherein the actuator includes a first compression cylinder and a second compression cylinder, wherein in the seated position each of the first compression cylinder and the second compression cylinder is in a compressed condition, and in the tilted position each of the first compression cylinder and the second compression cylinder is in an extended position.

7. The seat base assembly of claim 6 further comprising a rod coupled to one of the upper seat base assembly and the lower seat base assembly, wherein the latch engages the rod to maintain the upper seat base assembly in a seated position and is disengaged from the rod upon actuation of the tilt release to move the upper seat base assembly to a tilted position.

8. The seat base assembly of claim 7 wherein the latch engages the rod with sufficient pressure applied to the seat when the seat is moved from the tilted position to the seated position.

\* \* \* \* \*